United States Patent
Kim et al.

(10) Patent No.: US 8,909,171 B2
(45) Date of Patent: Dec. 9, 2014

(54) RF ANTENNA SWITCH CIRCUIT, HIGH FREQUENCY ANTENNA COMPONENT, AND MOBILE COMMUNICATION DEVICE

(75) Inventors: Yu Sin Kim, Gyeonggi-do (KR); Sung Hwan Park, Gyeonggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 309 days.

(21) Appl. No.: 13/462,753

(22) Filed: May 2, 2012

(65) Prior Publication Data

US 2013/0023221 A1    Jan. 24, 2013

(30) Foreign Application Priority Data

Jul. 19, 2011  (KR) .................. 10-2011-0071533
Jul. 19, 2011  (KR) .................. 10-2011-0071534

(51) Int. Cl.
    *H04B 1/44*    (2006.01)
(52) U.S. Cl.
    CPC ..................................... *H04B 1/44* (2013.01)
    USPC .......................................................... 455/83
(58) Field of Classification Search
    CPC ............... H04B 1/44; H04B 1/48; H04B 1/52
    USPC .......................................................... 455/83
    See application file for complete search history.

(56) References Cited

U.S. PATENT DOCUMENTS 6,882,829 B2 * 4/2005 Mostov et al. .................. 455/83
7,194,284 B2 * 3/2007 Rousu ........................ 455/553.1
7,738,841 B2 * 6/2010 Ahn et al. ........................ 455/78
7,843,280 B2 * 11/2010 Ahn et al. ...................... 333/103
7,890,063 B2 * 2/2011 Ahn et al. ........................ 455/78
2003/0190895 A1 * 10/2003 Mostov et al. .................. 455/78
2006/0217078 A1 9/2006 Glass et al.

FOREIGN PATENT DOCUMENTS

| JP | 2007-243410 A | 9/2007 |
| KR | 1020010050951 | 6/2001 |
| KR | 1020050055857 | 6/2005 |
| KR | 1020070044504 | 4/2007 |
| KR | 100723687 | 5/2007 |
| KR | 1020080106942 | 12/2008 |
| KR | 1020090028686 | 3/2009 |
| KR | 1020090132481 | 12/2009 |

* cited by examiner

*Primary Examiner* — April G Gonzales
(74) *Attorney, Agent, or Firm* — Bracewell & Giuliani LLP; Brad Y. Chin (57) ABSTRACT

The present invention relates to an RF antenna switch circuit, a high frequency antenna component, and a mobile communication device. According to the present invention, an RF antenna switch circuit including: an antenna; an input/output terminal including at least one transmitting terminal and at least one receiving terminal; at least one transmitting switch block disposed on a transmitting path(s) between the at least one transmitting terminal and a common node; at least one receiving switch block disposed on a receiving path(s) between the at least one receiving terminal and the common node; and a common switch block sharing a switching device and turned on by synchronizing with each of transmitting and receiving operations on transceiving the signal through the antenna is provided. When one of the transmitting and receiving operations is turned on, the other is turned off.

20 Claims, 5 Drawing Sheets

RF ANTENNA SWITCH CIRCUIT, HIGH FREQUENCY ANTENNA COMPONENT, AND MOBILE COMMUNICATION DEVICE

CROSS-REFERENCE TO RELATED APPLICATIONS

Claim and incorporate by reference domestic priority application and foreign priority application as follows:

"CROSS REFERENCE TO RELATED APPLICATION

This application claims the benefit under 35 U.S.C. Section 119 of Korean Patent Application Serial Nos. 10-2011-0071533 and 10-2011-0071534 entitled filed Jul. 19, 2011, which is hereby incorporated by reference in its entirety into this application."

BACKGROUND OF THE INVENTION

1. Field of the Invention

The present invention relates to an RF antenna switch circuit, a high frequency antenna component, and a mobile communication device, and more particularly, to an RF antenna switch circuit including a common switch block, a high frequency antenna component, and a mobile communication device.

2. Description of the Related Art

In a highly information-oriented society, use of various mobile communication devices is being increased. These various mobile communication devices need mobility along with improvement of communication performance and thus miniaturization is also needed.

Accordingly, in high frequency components used in the mobile communication device, for example, an RF antenna, a multi-band RF antenna having an SPDT switch structure in which a transmitter and a receiver are integrated to support miniaturization is used. Particularly, this RF antenna is implemented as one chip along with the need for miniaturization.

A conventional RF antenna switch transceives a signal through one antenna by disposing a transmitting transistor on a transmitting path of a transmitting terminal and a receiving transistor on a receiving path of a receiving terminal.

At this time, in a conventional example, a plurality of transistors are disposed on the transmitting path and the receiving path to be connected in series to withstand high output power applied as input. That is, the plurality of transistors are connected to each of the transmitting path and the receiving path. When a plurality of switching devices such as transistors are connected to the transmitting path and the receiving path to withstand the inputted high output power, a size of an RF switch is increased.

Further, in a conventional SPDT switch structure, for example, when using an FET device, in on-off states of the FET, loss due to on-resistance and off-capacitance, not due to abnormal short-open circuits, occurs and isolation is reduced. At this time, since trade-off exists between insertion loss of a switching device on one path and isolation on the other path, it is necessary to improve an isolation characteristic with the other path.

Due to this, in a conventional example, in order to improve the isolation characteristic with the other path, a transmitting terminal-side shunt transistor and a receiving terminal-side shunt transistor are provided to be connected to a ground. At this time, in order to withstand high output power applied as input, the transmitting terminal-side shunt transistor and the receiving terminal-side shunt transistor form a structure in which a plurality of transistors are stacked in series. That is, the plurality of transistors are separately stacked in the respective transmitting terminal-side shunt circuit and the receiving terminal-side shunt circuit. Accordingly, the size of the RF switch is increased when designed to withstand high output power.

SUMMARY OF THE INVENTION

In order to meet miniaturization and one chip implementation of an RF antenna, it is necessary to reduce a size of an RF antenna switch while improving a high output power transmission characteristic or an isolation characteristic.

The present invention has been invented in order to overcome the above-described problems and it is, therefore, an object of the present invention to provide an RF antenna switch circuit capable of reducing a size of an RF antenna switch while improving a high output power transmission characteristic or an isolation characteristic and thus meeting miniaturization and one chip implementation by reducing the number of switching devices on a transmitting path and a receiving path and sharing the switching devices as many as the reduced switching devices in transmission and reception, and a high frequency antenna component and a mobile communication device using the same.

In order to overcome the above-described problems, in an embodiment of the present invention, there is provided an RF antenna switch circuit including: an antenna; an input/output terminal including at least one transmitting terminal and at least one receiving terminal; at least one transmitting switch block disposed on a transmitting path(s) between the at least one transmitting terminal and an antenna-side common node and transmitting a signal according to a control signal; at least one receiving switch block disposed on a receiving path(s) between the at least one receiving terminal and the common node and transmitting a signal to the receiving terminal according to a control signal; and a common switch block sharing a switching device and turned on by synchronizing with each of transmitting and receiving operations, on transceiving the signal through the antenna, wherein when one of the transmitting and receiving operations is turned on, the other is turned off.

In accordance with an embodiment of the present invention, the common switch block includes a common transceiving switch block which is disposed between the antenna and the common node and turned on by synchronizing with turn-on of each of the transmitting and receiving switch blocks, wherein when one of the transmitting and receiving switch blocks is turned on, the other is turned off.

In accordance with another embodiment of the present invention, each of the transmitting, receiving, and common transceiving switch blocks comprises a transistor(s).

Further, in an embodiment, each of the transmitting, receiving, and common transceiving switch blocks comprises a drain-source serial connection structure of a plurality of field effect transistors (FETs).

In accordance with another embodiment of the present invention, after one of the transmitting and receiving switch blocks is switched from on to off, the other is switched off to on with a time interval.

Further, in accordance with an embodiment of the present invention, the RF antenna switch circuit includes a control signal interval in which one of the transmitting and receiving switch blocks is conversely switched from off to on by synchronizing with switching from on to off of the other.

Moreover, in accordance with another embodiment of the present invention, the RF antenna switch circuit further includes a plurality of shunt switch blocks shunt-connected to the at least one transmitting terminal side on the transmitting path and the at least one receiving terminal side on the receiving path in parallel to the transmitting and receiving switch blocks, respectively, wherein when one of the transmitting and receiving switch blocks is turned on, the shunt switch block, which is shunt-connected in parallel to it, is turned off and the remaining shunt switch block, which is not shunt-connected, is turned on.

In accordance with another embodiment, at least a portion of the receiving switch block is formed by connecting a first receiving switch block and a second receiving switch block in series on one receiving path, wherein the shunt switch block shunt-connected to the receiving path on which the first and second receiving switch blocks are connected in series is shunt-connected to a node between the first and second receiving switch blocks.

Further, in accordance with an embodiment, one side ends of the plurality of shunt switch blocks are connected to each of the transmitting and receiving terminals and the other side ends are connected to a ground-side common node and the common transceiving switch block further includes a common shunt switch block disposed between the ground-side common node and a ground and turned on by synchronizing with turn-on of each of the plurality of shunt switch blocks.

Further, in accordance with another embodiment of the present invention, the input/output terminal comprises one transmitting terminal and one receiving terminal, and each of the transmitting and receiving switch blocks comprises one switch block.

Further, in accordance with an embodiment of the present invention, the RF antenna switch circuit further includes at least one transmitting terminal-side shunt switch block shunt-connected to the at least one transmitting terminal side in parallel to the transmitting switch block; and at least one receiving terminal-side shunt switch block shunt-connected to the at least one receiving terminal in parallel to the receiving switch block, and the common switch block includes the common shunt switch block connected between the ground-side common node, to which the transmitting terminal-side and receiving terminal-side shunt switch blocks are connected in common, and the ground and turned on by synchronizing with turn-on of each of the transmitting terminal-side and receiving terminal-side shunt switch blocks, wherein when one of the transmitting and receiving switch blocks is in on state, the other is in off state, and the shunt switch block shunt-connected in parallel to one of the transmitting and receiving switch blocks, which is in on state, is in off state.

In accordance with an embodiment of the present invention, when one of the transmitting and receiving switch blocks is in on state, the shunt switch block, which is shunt-connected in parallel to it, is in off state and the remaining shunt switch block, which is not shunt-connected, is synchronized to be turned on.

In accordance with another embodiment, after one of the transmitting and receiving switch blocks is switched from on to off, the other is switched off to on with a time interval.

Further, in accordance with an embodiment, the RF antenna switch circuit includes a control signal interval in which one of the transmitting and receiving switch blocks is conversely switched from off to on by synchronizing with switching from on to off of the other.

In accordance with another embodiment of the present invention, each of the transmitting, receiving, transmitting terminal-side shunt, receiving terminal-side shunt, and common shunt switch blocks comprises a transistor(s).

At this time, in accordance with another embodiment, each of the transmitting terminal-side shunt, receiving terminal-side shunt, and common shunt switch blocks has a structure in which a plurality of drain-source connected field effect transistors (FETs) are stacked.

Further, in accordance with another embodiment of the present invention, at least a portion of the receiving switch block is formed by connecting the first receiving switch block and the second receiving switch block in series on one receiving path, wherein the receiving terminal-side shunt switch block shunt-connected to the receiving path on which the first and second receiving switch blocks are connected in series is shunt-connected to the node between the first and second receiving switch blocks.

Moreover, in accordance with another embodiment of the present invention, the input/output terminal comprises one transmitting terminal and one receiving terminal, and each of the transmitting and receiving switch blocks comprises one switch block.

Further, in order to overcome the above-described problems, there is provided a high frequency antenna component using an RF antenna switch circuit according to the above-described embodiments.

Further, in order to overcome the above-described problems, there is provided a mobile communication device including a high frequency antenna component according to the above-described embodiment.

Further, in accordance with an embodiment of the present invention, an input/output terminal of the RF antenna switch circuit used in the high frequency antenna component comprises one transmitting terminal and one receiving terminal, and each of transmitting and receiving switch blocks of the RF antenna switch circuit used in the high frequency antenna component comprises one switch block.

Although not explicitly mentioned as one aspect of the present invention, embodiments of the present invention according to various possible combinations of the above-mentioned technical features can be apparently implemented by those skilled in the art.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERABLE EMBODIMENTS

Embodiments of the present invention to achieve the above-described objects will be described with reference to the accompanying drawings. In this description, the same elements are represented by the same reference numbers, and additional description which is repeated or limits interpretation of the meaning of the invention may be omitted.

Before the detailed description, in this specification, when an element is referred to as being "connected" or "coupled" to another element, it can be "directly" connected or coupled to the other element or connected or coupled to the other element with another element interposed therebetween, unless it is referred to as being "directly connected" or "directly coupled" to the other element.

Although the singular form is used in this specification, it should be noted that the singular form can be used as the concept representing the plural form unless being contradictory to the concept of the invention or clearly interpreted otherwise. In this specification, it should be understood that the terms such as "having", "including", and "comprising" used herein do not preclude existence or addition of one or more other features or elements or combination thereof.

Hereinafter, an RF antenna switch circuit, a high frequency antenna component, and a mobile communication device in accordance with embodiments of the present invention will be described in detail with reference to the accompanying drawings.

Figure 1:
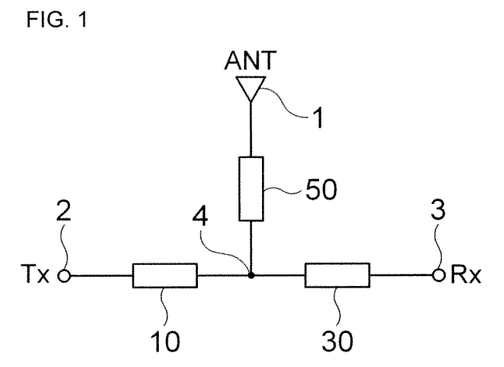
FIG. 1 is a block diagram schematically showing an RF antenna switch circuit in accordance with an embodiment of the present invention.
Figure 2:
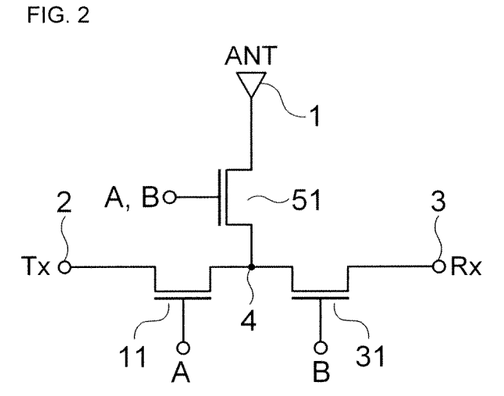
FIG. 2 is a view schematically showing an RF antenna switch circuit in accordance with another embodiment of the present invention.
Figure 3:
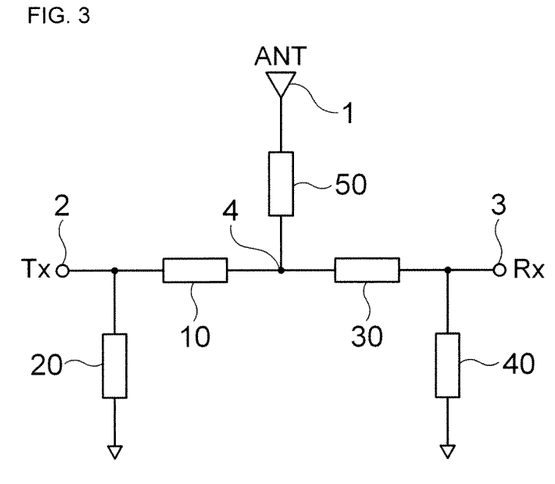
FIG. 3 is a block diagram schematically showing an RF antenna switch circuit in accordance with another embodiment of the present invention.
Figure 4:
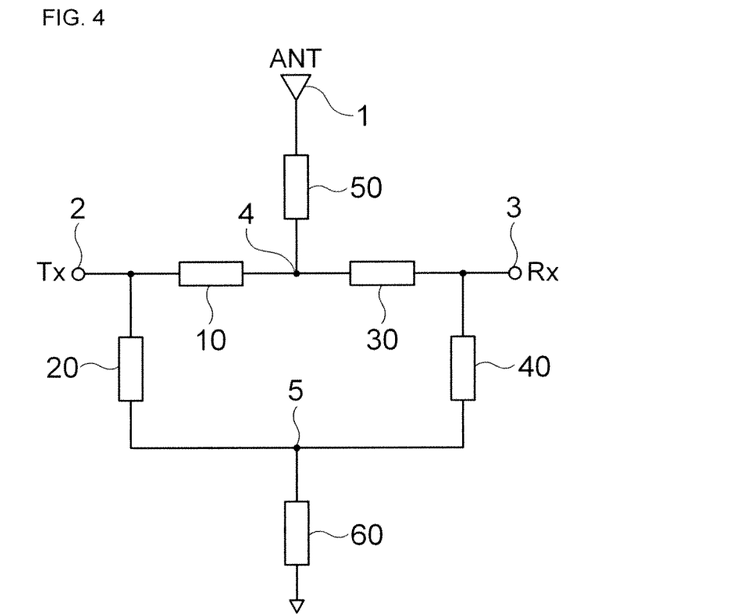
FIG. 4 is a block diagram schematically showing an RF antenna switch circuit in accordance with another embodiment of the present invention.
Figure 5:
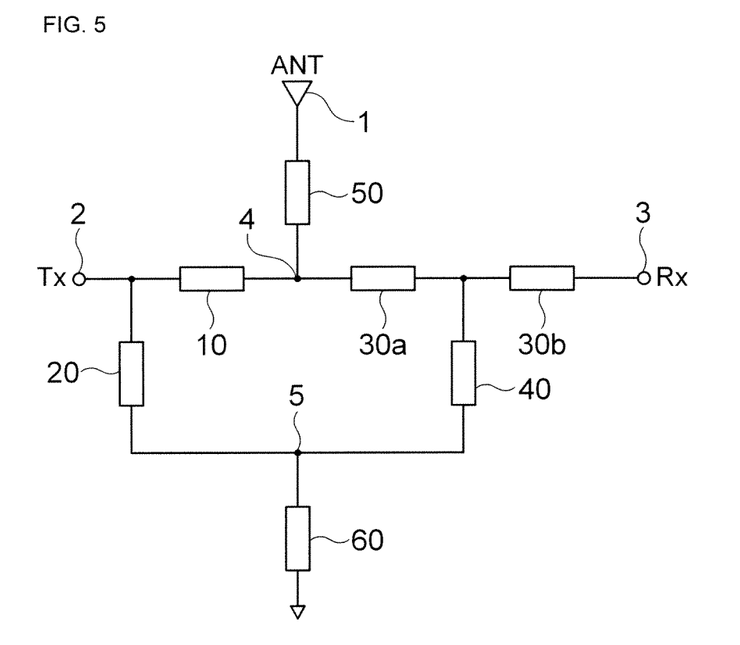
FIG. 5 is a block diagram schematically showing an RF antenna switch circuit in accordance with another embodiment of the present invention.
Figure 6A:
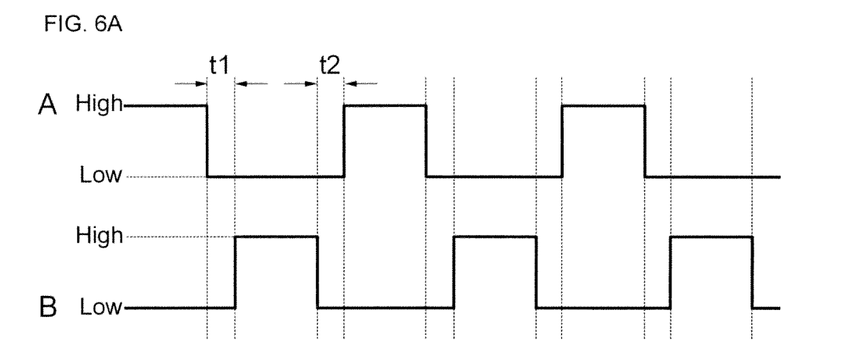
FIGS. 6A and 6B schematically show a control signal applied to an RF antenna switch circuit in accordance with an embodiment of the present invention.
Figure 6B:
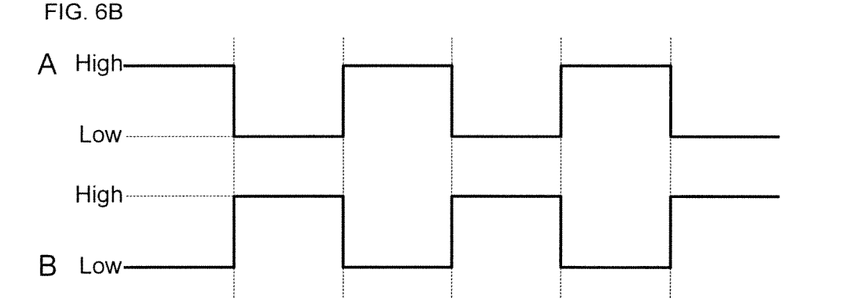

FIG. 1 is a block diagram schematically showing an RF antenna switch circuit in accordance with an embodiment of the present invention. FIG. 2 is a view schematically showing an RE antenna switch circuit in accordance with another embodiment of the present invention. FIG. 3 is a block diagram schematically showing an RF antenna switch circuit in accordance with another embodiment of the present invention. FIG. 4 is a block diagram schematically showing an RF antenna switch circuit in accordance with another embodiment of the present invention. FIG. 5 is a block diagram schematically showing an RF antenna switch circuit in accordance with another embodiment of the present invention, and FIGS. 6A and 6B schematically show a control signal applied to an RF antenna switch circuit in accordance with an embodiment of the present invention.

Figure 7:
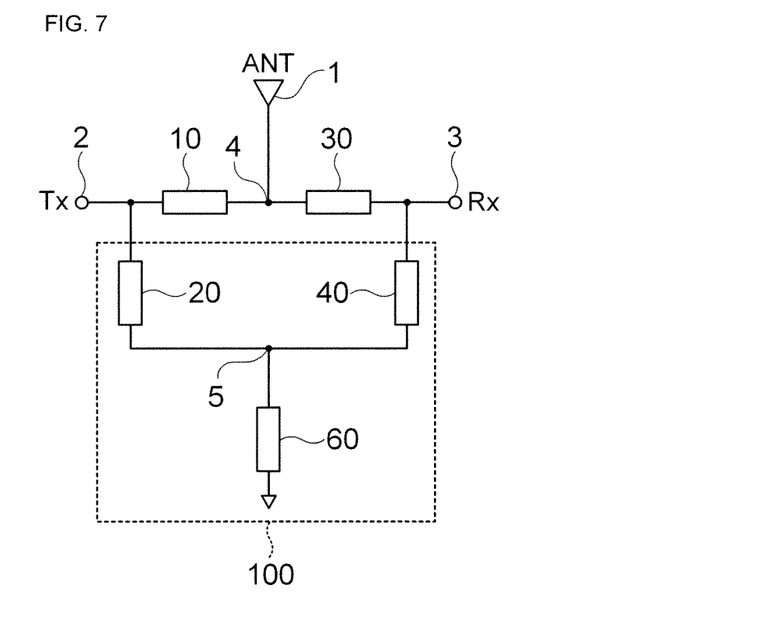
FIG. 7 is a block diagram schematically showing an RF antenna switch circuit in accordance with an embodiment of the present invention.
Figure 8:
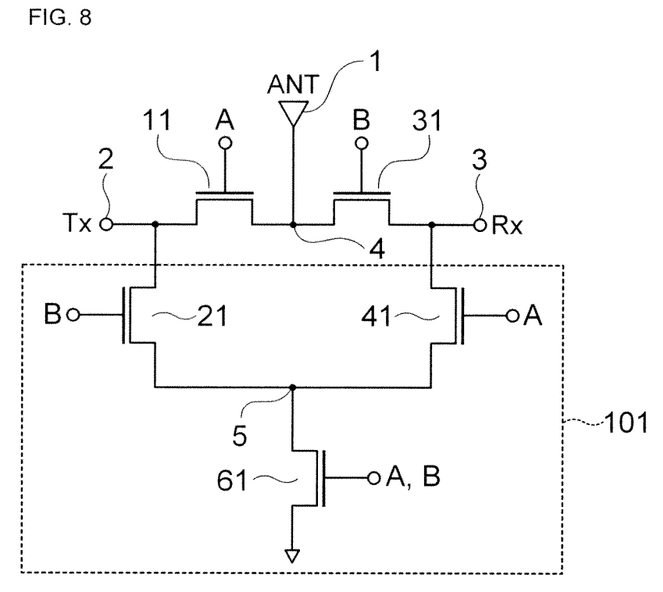
FIG. 8 is a view schematically showing an RF antenna switch circuit in accordance with another embodiment of the present invention.
Figure 9:
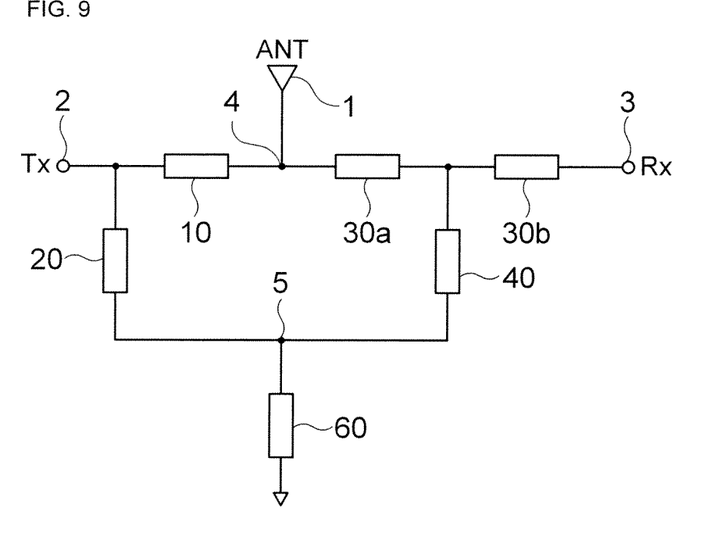
FIG. 9 is a block diagram schematically showing an RF antenna switch circuit in accordance with another embodiment of the present invention.
Figure 10A:
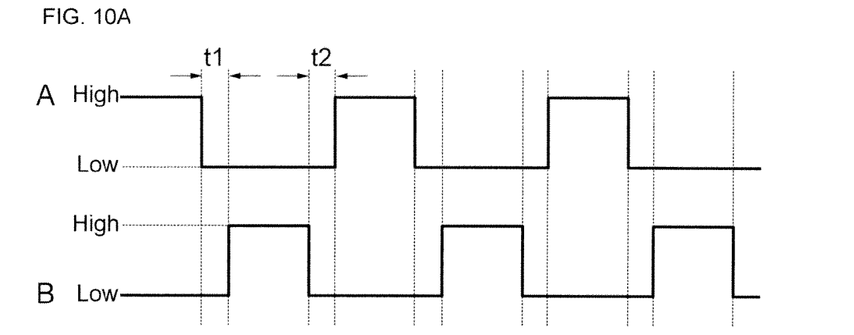
FIGS. 10A and 10B schematically show a control signal applied to an RF antenna switch circuit in accordance with an embodiment of the present invention.
Figure 10B:
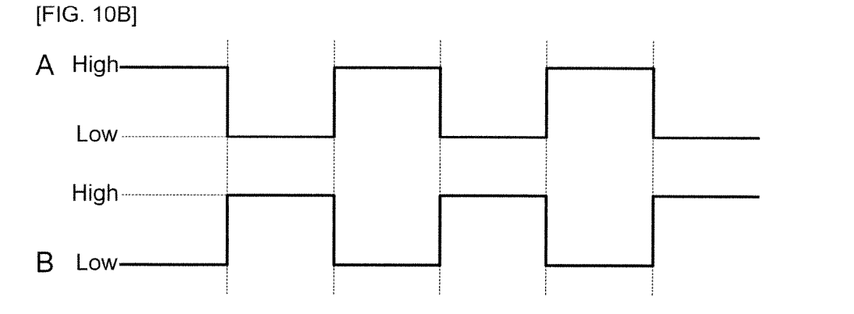

FIG. 7 is a block diagram schematically showing an RF antenna switch circuit in accordance with an embodiment of the present invention, FIG. 8 is a view schematically showing an RF antenna switch circuit in accordance with another embodiment of the present invention, FIG. 9 is a block diagram schematically showing an RF antenna switch circuit in accordance with another embodiment of the present invention, and FIGS. 10A and 10B schematically show a control signal applied to an RF antenna switch circuit in accordance with an embodiment of the present invention.

Hereinafter, reference numbers, which are not shown in the reference drawing, should be understood by referring to reference numbers of another drawing for the same components.

An RF antenna switch circuit in accordance with an embodiment of the present invention includes an antenna 1, an input/output terminal including at least one transmitting terminal 2 and at least one receiving terminal 3, at least one transmitting switch block 10, at least one receiving switch block 30, and a common switch block (refer to reference number 50 of FIG. 1 or reference number 60 of FIG. 7).

The antenna 1 transmits a signal input from the transmitting terminal 2 to the outside and transmits a signal received from the outside to the receiving terminal 3. Since transmission and reception are performed in one antenna 1, according to an example, the RF antenna switch circuit has a single pole double throw (SPDT) switch structure.

The input/output terminal includes the at least one transmitting terminal 2 and the at least one receiving terminal 3. In FIGS. 1 to 5, each of the transmitting terminal 2 and the receiving terminal 3 is provided in singular. Although not shown, an embodiment of the present invention includes the case in which each of the transmitting terminal 2 and the receiving terminal 3 is provided in plural or one of the transmitting terminal 2 and the receiving terminal 3 is provided in plural as well as the case in which each of the transmitting terminal 2 and the receiving terminal 3 is provided in singular.

As an aspect of an embodiment of the present invention, the input/output terminal comprises one transmitting terminal 2 and one receiving terminal 3.

The transmitting switch block 10 is disposed on a transmitting path between the transmitting terminal 2 and an antenna-side common node 4. At this time, at least one transmitting switch block 10 is disposed on the transmitting path between the at least one transmitting terminal 2 and the antenna-side common node 4. The transmitting switch block 10 is turned on according to a control signal and transmits a signal to the common node 4. In an example, the transmitted signal may be transmitted to the outside by the antenna 1, for example, through the common transceiving switch block 50 of FIG. 1.

Further, the receiving switch block 30 is disposed on a receiving path between the receiving terminal 3 and the antenna-side common node 4. At this time, at least one receiving switch block 30 is disposed on the receiving path between the at least receiving terminal 3 and the antenna-side common node 4. The receiving switch block 30 is turned on according to a control signal and transmits a signal from the common node 4 to the receiving terminal 3. At this time, when one of the transmitting and receiving switch blocks 10 and 30 is in on state, the other of the transmitting and the receiving switch blocks 10 and 30 is in off state. Accordingly, a signal transmitted through the transmitting path on which the turned-on transmitting switch block 10 is disposed is transmitted to the antenna 1, and a signal received by the antenna 1 is transmitted to the receiving terminal 3 through the receiving path on which the turned-on receiving switch block 30 is disposed.

In an embodiment of the present invention, when one transmitting terminal 2 and one receiving terminal 3 are provided, each of the transmitting switch block 10 and the receiving switch block 30 comprises one switch block.

In an embodiment of the present invention, on transceiving the signal through the antenna, the common switch block (reference number 50 of FIG. 1 or reference number 60 of FIG. 7) shares a switching device and turned on by synchronizing with each of transmitting and receiving operations. At this time, when one of the transmitting and receiving operations is turned on, the other is turned off.

One specific embodiment will be described with reference to FIG. 1.

Referring to FIG. 1, the common transceiving switch block 50 is disposed between the antenna 1 and the common node 4. The common transceiving switch block 50 is turned on by synchronizing with turn-on of the respective transmitting and receiving switch blocks 10 and 30.

Further, in this embodiment, when one of the transmitting and receiving switch blocks 10 and 30 is turned on, the other of the transmitting and receiving switch blocks 10 and 30 is turned off. Accordingly, a signal transmitted through the transmitting path on which the turned-on transmitting switch block 10 is disposed is transmitted to the antenna 1 through the common transceiving switch block 50. A signal, which is received by the antenna 1 and passes through the common transceiving switch block 50, is transmitted to the receiving terminal 3 through the receiving path on which the turned-on receiving switch block 30 is disposed.

According to this embodiment referring to FIG. 1, since the common transceiving switch block 50 can be commonly used on the transmitting path and the receiving path, it is possible to reduce a size of an RF switch.

An embodiment of the present invention will be described with reference to FIG. 2.

In accordance with an embodiment of the present invention, the at least one transmitting switch block 10, the at least one receiving switch block 30, and the common transceiving switch block 50 consist of transistors 11, 31, and 51, respectively. In an example, the transistor is a field effect transistor. Although FIG. 2 shows that each of the transmitting, receiving, and common transceiving switch blocks 10, 30, and 50 comprises one transistor 11, 31, and 51, each of the transmitting, receiving, or/and common transceiving switch blocks 10, 30, and 50 may consist of a plurality of transistors. At this time, the number of transistors 11, 31, and 51 of the respective transmitting, receiving, and common transceiving switch blocks 10, 30, and 50 may be equal to or different from each other. Further, at this time, it is possible to improve an isolation characteristic in high power transmission by increasing the number of transistors of the receiving switch block 30 than that of the transmitting switch block 10.

In an example, each of the transmitting, receiving, and common transceiving switch blocks 10, 30, and 50 comprises a plurality of field effect transistors (FETs) and at this time, forms a drain-source serial connection structure.

An embodiment of the present invention will be described with reference to FIGS. 6A and 6B.

Referring to FIG. 6A, in an embodiment of the present invention, after one of the at least one transmitting switch block 10 and the at least one receiving switch block 30 is switched from on to off, the other of the at least one transmitting switch block 10 and the at least one receiving switch block 30 is switched from off to on with a time interval. For example, in an SPDT switch structure consisting of one transmitting terminal 2 and one receiving terminal 3, after the transmitting switch block 10 on the transmitting path is switched from on to off, the receiving switch block 30 on the receiving path is switched from off to on with a time interval. Further, on the contrary, after the receiving switch block 30 on the receiving path is switched from on to off, the transmitting switch block 10 on the transmitting path is switched from off to on with a time interval.

A case in which a control signal of FIG. 6A is applied to the RF antenna switch circuit of FIG. 2 will be described. When the control signal of FIG. 6A is applied, first, the transmitting transistor 11 is turned on in a state in which a control signal A is in high state and the common transistor 51 is turned on at the same time. At this time, since a control signal B is in low state, the receiving transistor 31 remains in off state. At this time, a signal from the receiving terminal 2 is transmitted to the outside by the antenna 1 through the transmitting transistor 11 and the common transistor 51. After that, when the control signal A is changed into low state, the transmitting transistor 11 and the common transistor 51 become off state. At this time, since the control signal B is also in low state for a time t1, the receiving transistor 31 also remains in off state. Since both of the control signals A and B are in low state for the time t1, all of the transmitting transistor 11, the receiving transistor 31, and the common transistor 51 are in off state. When the control signal B in high state is applied to the receiving transistor 31 and the common transistor 51 after the time t1, since the receiving transistor 31 and the common transistor 51 are turned on and the control signal A, on the other hand, is in low state, the transmitting transistor 11 remains in off state. At this time, a signal received by the antenna 1 is transmitted to the receiving terminal 3 through the common transistor 51 and the receiving transistor 31. After that, when the control signal B is changed into low state, the receiving transistor 31 and the common transistor 51 become off state. At this time, since the control signal A is also in low state for a time t2, the transmitting transistor 11 also remains in off state. The control signal A in high state is applied to the transmitting transistor 11 and the common transistor 51 after the time t2 so that the transmitting transistor 11 and the common transistor 51 are turned on.

Further, another embodiment of the present invention will be described with reference to FIG. 6B. A control signal is applied so that one of the at least one transmitting switch block 10 and the at least one receiving switch block 30 is conversely switched from off to on by synchronizing with switching from on to off of the other of the at least one transmitting switch block 10 and the at least one receiving switch block 30. This control signal may be applied in at least some time interval.

A case in which the control signal of FIG. 6B is applied to the RF antenna switch circuit of FIG. 2 will be described. When the control signal of FIG. 6B is applied, first, the transmitting transistor 11 is turned on when a control signal A is in high state, and the common transistor 51 is turned on at the same time. At this time, since a control signal B is in low state, the receiving transistor 31 remains in off state. At this time, a signal from the transmitting terminal 2 is transmitted by the antenna 1 through the transmitting transistor 11 and the common transistor 51. After that, when the control signal A is changed into low state, since the control signal B is changed into high state at the same time, the transmitting transistor 11 becomes off state and on the other hand, the receiving transistor 31 is turned on. At this time, since the common transistor 51 receives the control signal B in high state, it remains in on state. Accordingly, a signal received by the antenna 1 is transmitted to the receiving terminal 3 through the common transistor 51 and the receiving transistor 31.

Next, an embodiment of the present invention will be described with reference to FIG. 3.

Referring to FIG. 3, in an embodiment of the present invention, the RF antenna switch circuit further includes a plurality of shunt switch blocks 20 and 40. The shunt switch blocks 20 and 40 are connected in parallel to the transmitting switch block 10 and the receiving switch block 30, respectively. That is, the shunt switch blocks 20 and 40 are shunt-connected to the at least one transmitting terminal 2 side and the at least one receiving terminal 3 side on the transmitting path and the receiving path, respectively. In an example, as shown in FIG. 3, the other side ends of the shunt-connected shunt switch blocks 20 and 40 may be grounded or in another example, may be connected in common to a ground-side common node 5 as shown in FIG. 4.

The shunt-connected shunt switch block 20 and 40 is turned off according to a control signal when one of the transmitting switch block 10 and the receiving switch block 30 in parallel to it is turned on. On the other hand, the remaining shunt switch block, which is not shunt-connected to be in parallel to the turned-on switch block, is turned on according to a control signal.

In a multi-band RF switch circuit having one antenna 1 and a plurality of input/output terminals like an SPDT switch structure, for example, when using an FET device, in case of on-off states of the FET, loss due to on-resistance and off-capacitance, not due to abnormal short-open circuits, occurs and isolation is reduced. Therefore, since trade-off exists between insertion loss of a switching device on one path and isolation on the other path, it is necessary to improve an isolation characteristic with the other path.

Due to this, as in the embodiment of FIG. 3, it is possible to improve a transmission characteristic or/and isolation in high output transmission or/and reception by including the shunt switch blocks 20 and 40 in parallel to the respective transmitting and receiving switch blocks 10 and 30. Further, the number of switching devices, for example, transistors of the transmitting terminal-side shunt switch block 20 shunt-connected to the transmitting terminal 2, may be increased than the number of switching devices of the receiving terminal-side shunt switch block 40 shunt-connected to the receiving terminal 3. At this time, it is possible to more improve a power transmission performance of the transmitting path.

Next, an embodiment of the present invention will be described with reference to FIG. 4.

Referring to FIG. 4, in an embodiment of the present invention, the common switch block further includes a common shunt switch block 60 connected to the ground-side common node 5, to which the plurality of shunt switch blocks 20 and 40 are connected in common, as well as the common transceiving switch block 50. In FIG. 4, one side ends of the plurality of shunt switch blocks 20 and 40 are connected to the at least one transmitting terminal 2 and the at least one receiving terminal 3, respectively, and the other side ends of the plurality of shunt switch blocks 20 and 40 are connected to the ground-side common node 5. The common shunt switch block 60 is connected between the ground-side common node 5 and a ground and turned on by synchronizing with turn-on of each of the plurality of shunt switch blocks 20 and 40.

In this embodiment, it is possible to have substantially the same transmission characteristic while reducing the number of the switching devices of the shunt switch blocks 20 and 40, thereby remarkably reducing the size of the RF switch.

Further, an embodiment of the present invention will be described with reference to FIG. 5. Looking at FIG. 5, a structure of the receiving switch block 30 in the embodiment of FIG. 4 and a coupling structure of the receiving terminal-side shunt switch block 40 shunt-connected in parallel to the receiving switch block 30 are changed but can be applied to FIG. 3 in the same manner, except the common shunt switch block 60.

An embodiment of the present invention will be described with reference to FIG. 5. At least a portion of the receiving switch block 30 disposed on the receiving path is formed to have a structure in which a first receiving switch block 30a and a second receiving switch block 30b are connected in series on one receiving path. At this time, the receiving terminal-side shunt switch block 40 shunt-connected to the receiving path on which the first and second receiving switch blocks 30a and 30b are connected in series is shunt-connected to a node between the first and second switch blocks 30a and 30b. The number of switching devices, for example, transistors, of the receiving switch block having a structure in which the first receiving switch block 30a and the second receiving switch block 30b are connected in series is equal to or greater than the number of switching devices of a receiving switch block (not shown) without having such structure or/and the transmitting switch block 10.

In accordance with this embodiment, it is possible to improve an isolation characteristic by disposing the first receiving switch block 30a and the second receiving switch block 30b on the receiving path to be connected in series.

Next, another embodiment of the present invention will be described with reference to FIG. 7.

Referring to FIG. 7, the RF antenna switch circuit in accordance with an embodiment of the present invention further includes at least one transmitting terminal-side shunt switch block 20 and at least one receiving terminal-side shunt switch block 40.

At this time, the common switch block may consist of the common shunt switch block 60 of FIG. 7.

The transmitting terminal-side shunt switch block 20 and the receiving terminal-side shunt switch block 40 will be described with reference to FIG. 7. The transmitting terminal-side shunt switch block 20 is shunt-connected to the at least one transmitting terminal 2 side. At this time, one end of each transmitting terminal-side shunt switch block 20 is shunt-connected to each transmitting terminal 2 side in parallel to each transmitting switch block 10, and the other end of each transmitting terminal-side shunt switch block 20 is connected to the ground-side common node 5.

Further, the receiving terminal-side shunt switch block 40 is shunt-connected to the at least one receiving terminal 3 side. At this time, one end of each receiving terminal-side shunt switch block 40 is shunt-connected to each receiving terminal 3 in parallel to each receiving switch block 30, and the other end of each receiving terminal-side shunt switch block 40 is connected to the ground-side common node 5. In this specification, since each transmitting terminal 2 side or/and each receiving terminal 3 side mean the direction of each transmitting terminal 2 or/and the direction of each receiving terminal 3, they are used as meanings including each transmitting terminal 2 or/and each receiving terminal 3 themselves.

At this time, when one of the transmitting and receiving switch blocks 10 and 30 is in on state, the shunt switch block shunt-connected in parallel to one of the transmitting and receiving switch blocks, which is in on state, is in off state. Accordingly, it is possible to improve a transmission characteristic or isolation in high output power transmission.

When describing another embodiment of the present invention, when one of the transmitting and receiving switch blocks 10 and 30 is in on state, the shunt switch block, which is shunt-connected in parallel to it, is in off state and the remaining shunt switch block, which is not shunt-connected, is synchronized to be turned on.

In an example, the number of switching devices, for example, transistors of the transmitting terminal-side shunt switch block 20 shunt-connected to the transmitting terminal 2 may be increased than the number of switching devices of the receiving terminal-side shunt switch block 40 shunt-connected to the receiving terminal 3. At this time, it is possible to more improve the power transmission performance of the transmitting path.

Continuously, the common shunt switch block 60 will be described with reference to FIG. 7.

The common shunt switch block 60 is connected between the ground-side common node 5, to which the transmitting terminal-side and receiving terminal-side shunt switch blocks 20 and 40 are connected in common, and the ground. The common shunt switch block 60 is turned on by synchronizing with turn-on of each of the transmitting terminal-side and receiving terminal-side shunt switch blocks 20 and 40.

In this embodiment, by providing the common shunt switch block 60, it is possible to have substantially the same transmission characteristic or/and isolation characteristic while reducing the size of the RF switch by reducing the number of switching devices of the transmitting terminal-side and receiving terminal-side shunt switch blocks 20 and 40.

In accordance with this embodiment referring to FIG. 7, it is possible to reduce the size of the RF switch by commonly using the common shunt switch block 60 in a shunt circuit 100.

An embodiment of the present invention will be described with reference to FIG. 8.

In accordance with an embodiment of the present invention, the at least one transmitting switch block 10, the at least one receiving switch block 30, the at least one transmitting terminal-side shunt switch block 20, the at least one receiving terminal-side shunt switch block 40, and the common shunt switch block 60 consist of transistors 11, 31, 21, 41, and 61, respectively. In an example, the transistor is a field effect transistor. Although FIG. 2 shows that each of the transmitting, receiving, transmitting terminal-side shunt, receiving terminal-side shunt, and common shunt switch blocks 10, 30, 20, 40, and 60 comprises one transistor 11, 31, 21, 41, and 61, each of the transmitting, receiving, transmitting terminal-side shunt, receiving terminal-side shunt, or/and common shunt switch blocks 10, 30, 20, 40, and 60 may consist of a plurality of transistors. At this time, the number of transistors 11, 31, 21, 41, and 61 of the respective transmitting, receiving, transmitting terminal-side shunt, receiving terminal-side shunt, and common shunt switch blocks 10, 30, 20, 40, and 60 may be equal to or different from each other. Further, at this time, it is possible to improve the power transmission performance of the transmitting path by increasing the number of switching devices, for example, transistors of the transmitting terminal-side shunt switch block 20 than the number of switching devices of the receiving terminal-side shunt switch block 40.

In FIG. 8, since the common shunt transistor 61 can be commonly used in a shunt circuit 101, it is possible to reduce the size of the RF switch.

In an example, each of the transmitting terminal-side shunt, receiving terminal-side shunt, and common shunt switch blocks 20, 40, and 60 has a structure in which a plurality of drain-source connected field effect transistors (FETs) are stacked. Further, in an example, each of the transmitting and receiving switch blocks 10 and 30 comprises a plurality of field effect transistors (FETs), at this time, forms a drain-source serial connection structure.

An embodiment of the present invention will be described with reference to FIGS. 10A and 10B.

Referring to FIG. 10A, in an embodiment of the present invention, after one of the at least one transmitting switch block 10 and the at least one receiving switch block 30 is switched from on to off, the other of the at least one transmitting switch block 10 and the at least one receiving switch block 30 is switched from off to on with a time interval. At this time, when one of the transmitting and receiving switch blocks 10 and 30 is in on state, the shunt switch block, which is shunt-connected in parallel to it, is in off state. Further, when one of the transmitting and receiving switch blocks 10 and 30 is in on state, the other of the transmitting and receiving switch blocks 10 and 30, which is not shunt-connected to it, is synchronized to be turned on.

For example, in an SPDT switch structure consisting of one transmitting terminal 2 and one receiving terminal 3, after the transmitting switch block 10 on the transmitting path is switched from on to off, the receiving switch block 30 on the receiving path is switched from off to on with a time interval. Further, on the contrary, after the receiving switch block 30 on the receiving path is switched from on to off, the transmitting switch block 10 on the transmitting path is switched from off to on with a time interval.

A case in which a control signal of FIG. 10A is applied to the RF antenna switch circuit of FIG. 2 will be described. When the control signal of FIG. 10A is applied, first, the transmitting transistor 11 is turned on in a state in which a control signal A is in high state. At this time, since a control signal B is in low state, the receiving transistor 31 remains in off state. Further, since the control signal A is in high state and the control signal B is in low state, the receiving terminal-side shunt transistor 41 is turned on and the transmitting terminal-side shunt transistor 21 remains in off state. In addition, the common shunt transistor 61 is in on state. At this time, a signal from the transmitting terminal 2 is transmitted to the outside by the antenna 1 through the transmitting transistor 11 and it is possible to improve a transmission characteristic in high output transmission by the shunt circuit 101. After that, when the control signal A is changed into low state, the transmitting transistor 11, the receiving terminal-side shunt transistor 41, and the common shunt transistor 61 become off state. At this time, since the control signal B is also in low state for a time t1, the receiving transistor 31 and the transmitting terminal-side shunt transistor 21 also remain in off state. When the control signal B in high state is applied to the receiving transistor 31, the transmitting terminal-side shunt transistor 21, and the common shunt transistor 61 after the time t1, since the receiving transistor 31, the transmitting terminal-side shunt transistor 21, and the common shunt transistor 61 are turned on and the control signal A, on the other hand, is in low state, the transmitting transistor 11 and the receiving terminal-side shunt transistor 41 remain in off state. At this time, a signal received by the antenna 1 is transmitted to the receiving terminal 3 through the receiving transistor 31. After that, when the control signal B is changed into low state, the receiving transistor 31, the transmitting terminal-side shunt transistor 21, and the common shunt transistor 61 become off state. At this time, since the control signal A is also in low state for a time t2, the transmitting transistor 11 and the receiving terminal-side shunt transistor also remain in off state. The control signal A in high state is applied to the transmitting transistor 11, the receiving terminal-side shunt transistor 31, and the common shunt transistor 61 after the time t2 so that the transmitting transistor 11, the receiving terminal-side shunt transistor 31, and the common shunt transistor 61 are turned on.

Further, another embodiment of the present invention will be described with reference to FIG. 10B. A control signal is applied so that one of the at least one transmitting switch block 10 and the at least one receiving switch block 30 is conversely switched from off to on by synchronizing with switching from on to off of the other of the at least one transmitting switch block 10 and the at least one receiving switch block 30. This control signal may be applied in at least some time interval. At this time, when one of the transmitting and receiving switch blocks 10 and 30 is in on state, the shunt switch block, which is shunt-connected in parallel to it, is in off state. Further, when one of the transmitting and receiving switch blocks 10 and 30 is in on state, the shunt switch block, which is not shunt-connected to it, is synchronized to be turned on.

A case in which the control signal of FIG. 10B is applied to the RF antenna switch circuit of FIG. 8 will be described. When the control signal of FIG. 10B is applied, first, the transmitting transistor 11, the receiving terminal-side shunt transistor 41, and the common shunt transistor 61 are turned on when a control signal A is in high state. At this time, since a control signal B is in low state, the receiving transistor 31 and the transmitting terminal-side shunt transistor 21 remain in off state. At this time, a signal from the transmitting terminal 2 is transmitted to the outside by the antenna 1 through the transmitting transistor 11. After that, when the control signal A is changed into low state, since the control signal B is changed into high state at the same time, the transmitting transistor 11 and the receiving terminal-side shunt transistor 41 become off state and on the other hand, the receiving transistor 31 and the transmitting terminal-side shunt transistor 21 are turned on. At this time, since the common shunt transistor 61 receives the control signal B in high state, it remains in on state. Accordingly, a signal received by the antenna 1 is transmitted to the receiving terminal 3 through the receiving transistor 31.

Next, an embodiment of the present invention will be described with reference to FIG. 9.

Referring to FIG. 9, when describing an embodiment of the present invention, at least a portion of the receiving switch block 30 disposed on each receiving path is formed to have a structure in which the first receiving switch block 30a and the second receiving switch block 30b are connected in series on one receiving path. At this time, the receiving terminal-side shunt switch block 40 shunt-connected to the receiving path on which the first and second receiving switch blocks 30a and 30b are connected in series is shunt-connected to the node between the first and second receiving switch blocks 30a and 30b. The number of switching devices, for example, transistors, of the receiving switch block having a structure in which the first receiving switch block 30a and the second receiving switch block 30b are connected in series is equal to or greater than the number of switching devices of a receiving switch block (not shown) without such structure or/and the transmitting switch block 10.

In accordance with this embodiment, it is possible to improve an isolation characteristic by disposing the first receiving switch block 30a and the second receiving switch block 30b on the receiving path to be connected in series.

Next, a high frequency antenna component of the present invention will be described.

A high frequency antenna component in accordance with an embodiment of the present invention is a component using an embodiment of the above-described RF antenna switch circuit.

Further, a mobile communication device of the present invention will be described.

In accordance with an embodiment of the present invention, a mobile communication device of the present invention includes a high frequency antenna component using an embodiment of the above-described RF antenna switch circuit or the above-described high frequency antenna component.

As an example, an input/output terminal of an RF antenna switch circuit used in the high frequency antenna component comprises one transmitting terminal 2 and one receiving terminal 3, and each of transmitting and receiving switch blocks 10 and 30 of the RF antenna switch circuit used in the high frequency antenna component comprises one switch block.

According to an embodiment of the present invention, it is possible to reduce the size of the RF antenna switch while improving a high output power transmission characteristic or an isolation characteristic by reducing the number of switching devices on the transmitting path and the receiving path and sharing the switching devices as many as the reduced switching devices in transmission and reception.

Further, according to an embodiment of the present invention, it is possible to obtain an RF antenna switch circuit capable of meeting miniaturization and one-chip implementation by reducing a size of an RF antenna switch, and a high frequency antenna component and a mobile communication device using the same.

In addition, according to an embodiment of the present invention, it is possible to obtain an RF antenna switch circuit capable of improving a transmission characteristic and an isolation characteristic while reducing a size of an RF antenna switch, and a high frequency antenna component and a mobile communication device using the same.

It is apparent that various effects which have not been directly mentioned according to the various embodiments of the present invention can be derived by those skilled in the art from various constructions according to the embodiments of the present invention.

The above-embodiments and the accompanying drawings are provided as examples to help understanding of those skilled in the art, not limiting the scope of the present invention. Therefore, the various embodiments of the present invention may be embodied in different forms in a range without departing from the essential concept of the present invention, and the scope of the present invention should be interpreted from the invention defined in the claims. It is to be understood that the present invention includes various modifications, substitutions, and equivalents by those skilled in the art.

What is claimed is:

1. An RE antenna switch circuit comprising:
   an antenna;
   an input/output terminal comprising at least one transmitting terminal and at least one receiving terminal;
   at least one transmitting switch block disposed on a transmitting path(s) between the at least one transmitting terminal and an antenna-side common node and transmitting a signal according to a control signal;
   at least one receiving switch block disposed on a receiving path(s) between the at least one receiving terminal and the common node and transmitting a signal to the receiving terminal according to a control signal
   a plurality of shunt switch blocks shunt-connected to the at least one transmitting terminal side on the transmitting path and the at least one receiving terminal side on the receiving path in parallel to the transmitting and receiving switch blocks, respectively; and
   a common switch block sharing a switching device and turned on by synchronizing with each of transmitting and receiving operations, on transceiving the signal through the antenna,
   wherein when one of the transmitting and receiving operations is turned on, the other is turned off,
   wherein when one of the transmitting and receiving switch blocks is turned on, the shunt switch block, which is shunt-connected in parallel to it, is turned off and the remaining shunt switch block, which is not shunt-connected, is turned on.

2. The RF antenna switch circuit according to claim 1, wherein the common switch block comprises a common transceiving switch block disposed between the antenna and the common node and turned on by synchronizing with turn-on of each of the transmitting and receiving switch blocks, and when one of the transmitting and receiving switch blocks is turned on, the other is turned off.

3. The RF antenna switch circuit according to claim 2, wherein each of the transmitting, receiving, and common transceiving switch blocks comprises a transistor(s).

4. The RF antenna switch circuit according to claim 3, wherein each of the transmitting, receiving, and common transceiving switch blocks comprises a drain-source serial connection structure of a plurality of field effect transistors (FETs).

5. The RF antenna switch circuit according to claim 2, wherein after one of the transmitting and receiving switch blocks is switched from on to off, the other is switched from off to on with a time interval.

6. The RF antenna switch circuit according to claim 2, wherein the RF antenna switch circuit comprises a control signal interval in which one of the transmitting and receiving switch blocks is conversely switched from of to on by synchronizing with switching from on to off of the other.

7. The RF antenna switch circuit according to claim 2, wherein at least a portion of the receiving switch block is formed by connecting a first receiving switch block and a second receiving switch block in series on one receiving path,
wherein the shunt switch block shunt-connected to the receiving path on which the first and second receiving switch blocks are connected in series is shunt-connected to a node between the first and second receiving switch blocks.

8. The RF antenna switch circuit according to claim 2, wherein one side ends of the plurality of shunt switch blocks are connected to each of the transmitting and receiving terminals and the other side ends are connected to a ground-side common node and the common switch block further comprises a common shunt switch block disposed between the ground-side common node and the ground and turned on by synchronizing with turn-on of each of the plurality of shunt switch blocks.

9. The RF antenna switch circuit according to claim 2, wherein the input/output terminal comprises one transmitting terminal and one receiving terminal, and each of the transmitting and receiving switch blocks comprises one switch block.

10. The RF antenna switch circuit according to claim 1, wherein the plurality of shunt switch blocks comprise at least one transmitting terminal-side shunt switch block shunt-connected to the at least one transmitting terminal side in parallel to the transmitting switch block and at least one receiving terminal-side shunt switch block shunt-connected to the at least one receiving terminal side in parallel to the receiving switch block,
wherein the common switch block comprises the common shunt switch block connected between the ground-side common node, to which the transmitting terminal-side and receiving terminal-side shunt switch blocks are connected in common, and the ground and turned on by synchronizing with turn-on of each of the transmitting terminal-side and receiving terminal-side shunt switch blocks, and
when one of the transmitting and receiving switch blocks is in on state, the other is in off state, and the shunt switch block shunt-connected to one of the transmitting and receiving switch blocks, which is in on state, is in off state.

11. The RF antenna switch circuit according to claim 10, wherein when one of the transmitting and receiving switch blocks is in on state, the shunt switch block shunt-connected in parallel to it is in off state and the remaining shunt switch block, which is not shunt-connected, is synchronized to be turned on.

12. The RF antenna switch circuit according to claim 11, wherein after one of the transmitting and receiving switch blocks is switched from on to off, the other is switched off to on with a time interval.

13. The RF antenna switch circuit according to claim 11, wherein the RF antenna switch circuit comprises a control signal interval in which one of the transmitting and receiving switch blocks is conversely switched from off to on by synchronizing with switching from on to off of the other.

14. The RF antenna switch circuit according to claim 10, wherein each of the transmitting, receiving, transmitting terminal-side shunt, receiving terminal-side shunt, and common shunt switch blocks comprises a transistor(s).

15. The RF antenna switch circuit according to claim 14, wherein each of the transmitting terminal-side shunt, receiving terminal-side shunt, and common shunt switch blocks has a structure in which a plurality of drain-source connected field effect transistors (FETs) are stacked.

16. The RE antenna switch circuit according to claim 10, wherein at least a portion of the receiving switch block is formed by connecting the first receiving switch block and the second receiving switch block in series on one receiving path,
wherein the receiving terminal-side shunt switch block shunt-connected to the receiving path on which the first and second receiving switch blocks are connected in series is shunt-connected to the node between the first and second receiving switch blocks.

17. The RF antenna switch circuit according to claim 10, wherein the input/output terminal comprises one transmitting terminal and one receiving terminal, and each of the transmitting and receiving switch blocks comprises one switch block.

18. A high frequency antenna component using an RF antenna switch circuit according to claim 1.

19. A mobile communication device comprising:
a high frequency antenna component according to claim 18.

20. The mobile communication device according to claim 19, wherein an input/output terminal of the RF antenna switch circuit used in the high frequency antenna component comprises one transmitting terminal and one receiving terminal, and each of transmitting and receiving switch blocks of the RF antenna switch circuit used in the high frequency antenna component comprises one switch block.

* * * * *